United States Patent [19]

Minozzi et al.

[11] 4,378,100

[45] Mar. 29, 1983

[54] STAND AND STOOL

[75] Inventors: Ferdinand R. Minozzi; Stephen A. Minozzi, both of Yonkers; Robert R. Pelepako, Dobbs Ferry, all of N.Y.

[73] Assignee: M.B.O. Music Enterprises, Inc., Dobbs Ferry, N.Y.

[21] Appl. No.: 912,972

[22] Filed: Jun. 5, 1978

Related U.S. Application Data

[63] Continuation-in-part of Ser. No. 802,781, Jun. 2, 1977, abandoned.

[51] Int. Cl.³ .................... F16M 11/04; F16M 11/16; F16M 11/22
[52] U.S. Cl. .................................. 248/168; 248/173; 248/187; 248/440
[58] Field of Search .................. 248/23, 25, 154, 163, 248/165, 166, 168, 169, 172, 173, 176, 188, 188.6, 188.7, 188.91, 440, 316, 346, 187, 649, 676; 108/115, 158; 151/41.76; 211/203

[56] References Cited

U.S. PATENT DOCUMENTS

| | | | |
|---|---|---|---|
| Re. 21,752 | 3/1941 | Cushwa et al. | 405/153 |
| 168,673 | 10/1875 | Rosenfeld | 248/154 |
| 559,421 | 5/1896 | Tyler et al. | 248/25 |
| 686,006 | 11/1901 | McConnell | 248/169 X |
| 743,320 | 11/1903 | Otto | 248/168 X |
| 931,692 | 8/1909 | Fyfe | 248/187 X |
| 1,173,051 | 2/1916 | Smith | 248/169 X |
| 1,502,399 | 7/1924 | Renner | 411/180 |
| 1,513,637 | 10/1924 | Schwartz | 285/204 |
| 1,614,539 | 1/1927 | Ryan | 248/188.91 X |
| 1,852,978 | 4/1932 | Mitchel | 411/180 |
| 1,885,635 | 11/1932 | Schweitzer | 108/158 |
| 1,912,287 | 5/1933 | Lundell | 248/310 X |
| 2,069,008 | 1/1937 | Howard | 411/171 |
| 2,113,159 | 4/1938 | Moxley | 411/427 |
| 2,167,285 | 7/1939 | Smith | 411/171 |
| 2,210,047 | 8/1940 | Stieglitz | 248/165 |
| 2,248,273 | 7/1941 | Kranjc | 248/154 |
| 2,627,386 | 2/1953 | Akans | 248/168 |
| 3,424,423 | 1/1969 | Hampton | 248/188.7 X |
| 4,015,650 | 4/1977 | Anderson | 411/103 |

FOREIGN PATENT DOCUMENTS

| | | | |
|---|---|---|---|
| 614112 | 12/1926 | France | 248/166 |
| 270592 | 5/1927 | United Kingdom | 248/168 |
| 285795 | 5/1929 | United Kingdom | 248/346 |
| 932123 | 7/1963 | United Kingdom | 151/41.72 |

Primary Examiner—Roy D. Frazier
Attorney, Agent, or Firm—Philip Furgang

[57] ABSTRACT

Disclosed is a mount for a stand or stool. The support legs for the stand or stool are disposed in a pyramidal relationship with the mount at the apex. The legs, four in number, are disposed between parallel, spaced legs of L-shaped brackets and pivotally secured thereto. Unlike prior art devices, the brackets are integrally joined to the legs and removable from the remainder of the mount. The remainder of the mount comprises a support member or plate with a threaded rod depending perpendicularly therefrom. The rod passes between the L-shaped brackets which pivotally hold the legs. A flat washer is used to engage one side of the bracket and a wing nut is used to tighten the flat washer and the support member against the brackets to form a rigid mount for the stool or stand. An interlocking set of cross bars, pivotally mounted to the legs midway below the stand, keeps the legs extended and adds to the stability of the overall construction. The stand may be provided with L-shaped brackets, each of which has a slot formed therein in one leg. A threaded collar is secured to the underside of the support member and a thumb screw threaded therein to hold the L-shaped bracket releasably in place. The bracket is disposed to be pivotally moved to either one of two juxtaposed sides of the support member. A multi-use bracket comprises a rectangular planar member or plate having a symmetrically disposed depression and opposed complementary boss with an aperture therethrough. A clinch nut is secured in the aperture in the depression. A threaded bolt is threaded into the nut from the boss side.

3 Claims, 7 Drawing Figures

U.S. Patent  Mar. 29, 1983  Sheet 1 of 2  4,378,100
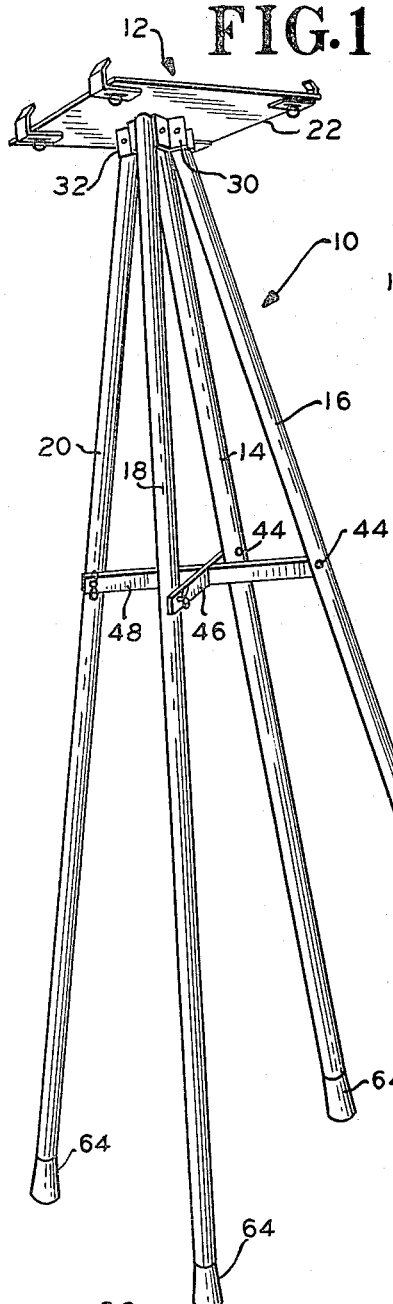
FIG. 1
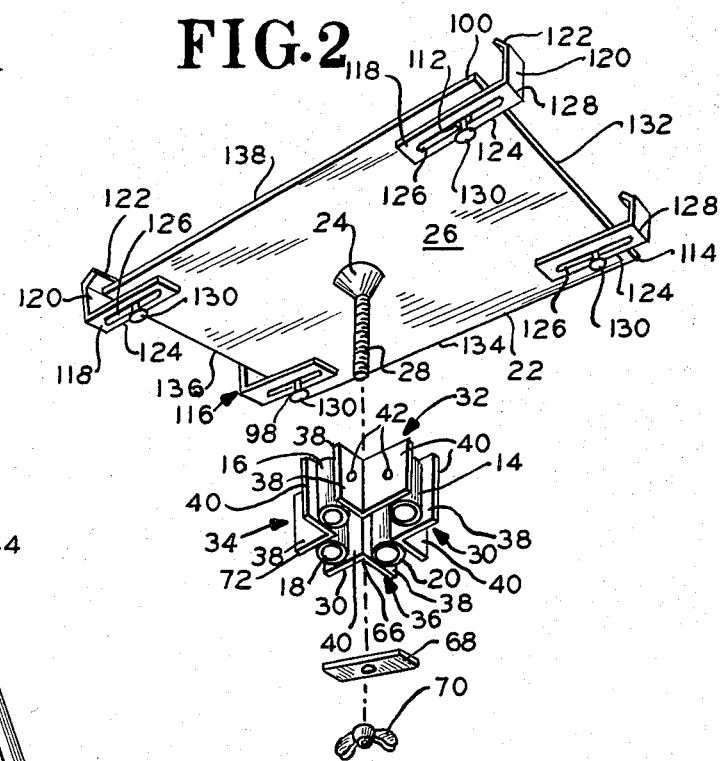
FIG. 2
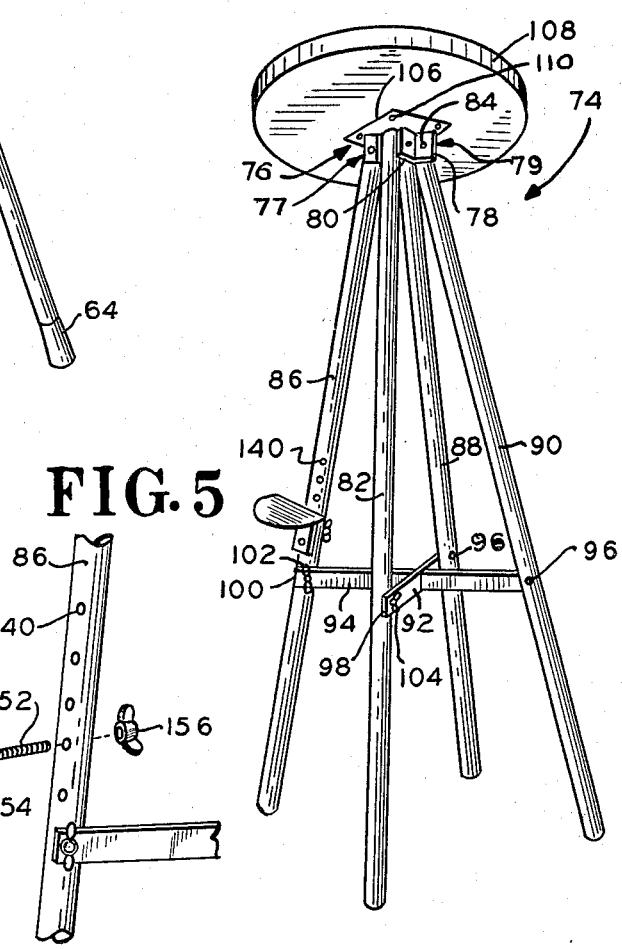
FIG. 4
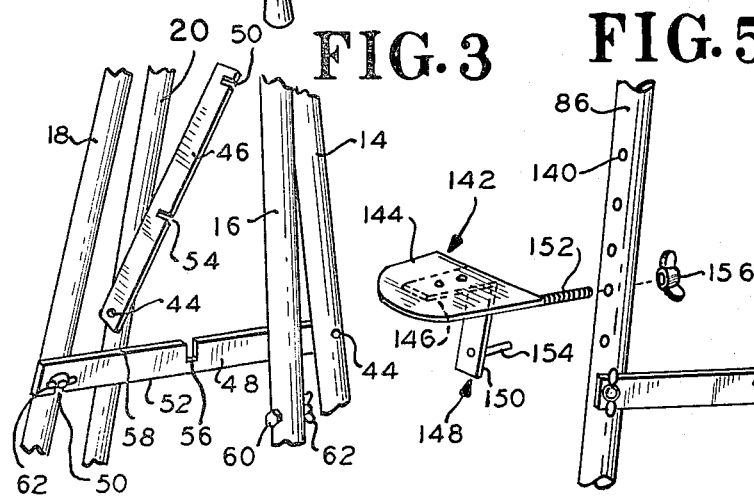
FIG. 3
FIG. 5

STAND AND STOOL

This is a continuation-in-part of Application Ser. No. 802,781, filed on June 2, 1977, now abandoned.

BACKGROUND OF THE INVENTION

This invention relates to stands or stools and, more particularly, to those stands and stools characterized by three or more legs disposed in a substantially pyramidal relationship and intended to support a weight-bearing member.

Stands or stools in which the legs are pyramidally disposed make for versatile structures in which the stands may easily be erected or collapsed. The legs act to distribute the weight. Thus, such stands or stools are well known and efficient. Prior stands or stools, however, are believed to have certain disadvantages, which have been overcome by the instant invention.

In pyramidal leg stools or stands, it is known to have the legs pivotally mounted between extending brackets. These brackets may be formed as an integral part of the weight-bearing surface. Usually, the integral connection of the brackets to the weight-bearing surface is made by welding or, in the alternative, by casting, or the like. Examples of such structure may be found in Caldwell (in U.S. Pat. No. 2,591,051), Hammond (U.S. Pat. No. 2,351,611), Fischer (German Pat. No. 181,265) and Bonanno (U.S. Pat. No. 3,210,034). It is obviously necessary that a stand or stool be stable. It is for this reason that the brackets, to which the legs are secured, must be structurally stable with reference to the weight-bearing member (such as a seat or stand rest).

Each of the devices disclosed in the above-mentioned patents have in common an integrally formed bracket and weight-supporting member. This makes for an expensive welded or cast member which may not be broken down further. The integrally formed brackets and weight-supporting member is relatively complicated to manufacture and provides for a bulky unit, even when the stand or stool is disassembled. The bracket or leg-holding device is generally cumbersome and sticks out from the weight-supporting member, making it inefficient to conveniently disassemble for shipment. Further, if the legs remain attached to brackets, the entire assembly is even more bulky when collapsed. The reason for the prior art approach to making the leg-joining brackets an integral portion of the mount is believed to be because it is essential that the mount be rigid and stable.

One interesting device was suggested by Raudabaugh (U.S. Pat. No. 996,524). In that patent, a central leg is disposed to extend vertically between the legs at the pyramidal joining thereof and extends vertically to the juncture of three arms, each of which is pivotally connected to one of the legs. The central arm extends between the brackets which hold the legs at the approximate apex of the pyramid. The central arm is formed with an indentation and a latching member. When the legs are extended, the indentation of the central arm is disposed between the brackets and the latch springs outwardly to grasp the bracket and force the arm against the bracket to prevent the legs from being collapsed. However, this arrangement provides no substantial support or rigidity to the interconnection of the legs and the bracket. Hence, while the item disclosed by Raudabaugh cannot be easily collapsed when open, the place wherein a stand or stool weight-supporting member should be is absent. It has no rigidity as such, since it is intended to serve as a hay rack.

SUMMARY OF THE INVENTION

It is an object of this invention to provide a stool or stand, the legs of which are disposed to define a polygonal structure and assembled from parts which may be rigidly secured and conveniently and economically disassembled into separate, smaller components.

It is a further object of this invention to provide a stand or stool simple in construction, economical in manufacture, and easy in assembly and use.

It is still a further object of this invention to provide a stable mount in which the brackets may be removed upon disassembly.

It is a further object of this invention to provide a weight support member having bracket mounts thereon for holding a work object, said bracket mounts providing substantial flexibility in the size and positioning of said work product.

It is still another object of this invention to provide an economically constructed and selectively positionable foot support for a stool or stand.

In accordance with the teachings of this invention, there is provided a mount for a support device such as a stool or stand. In general, the stand or stool would be of the type having support legs disposed in a substantially pyramidal configuration, with the mount at the apex. The mount of this invention comprises a weight-bearing member. Bracket means are provided, which are pivotally secured to the support legs. Means are provided for releasably securing the bracket means to the weight-bearing member to thereby form a rigid and stable mount.

In one aspect of this invention, the bracket means are individual brackets sandwiched between the weight-support member and a planar member.

In another aspect of the invention, there is provided a platform for supporting and retaining thereon a work object, such as a speaker or the like. The platform is of the type commonly used as part of a stand mount. The platform comprises a substantially planar polygonal support member for supporting the speakers on one side thereof and at least two substantially C-shaped brackets, each having one leg thereof slidably secured to the support member of the opposed side of the speaker-supporting side. The other leg of each of the C-shaped brackets extends, upwardly substantially perpendicularly with respect to the speaker-supporting side. The C-shaped brackets are positionable so as to be selectively spaced from either one of two juxtaposed polygonal sides, so that the platform can thereby accommodate speakers of differing dimensions.

In still another aspect of the invention, there is provided a foot support for a stool or the like. The foot support comprises a stool leg having a plurality of holes disposed at regular intervals therealong. A rigid platform is provided for supporting a foot. A dependent member is secured to the platform and extends perpendicularly thereto. There is also provided two spaced rods extending perpendicularly to the member and substantially parallel to the platform and disposed to be in registry with and extendable through selectives ones of the predetermined holes in the stool leg.

A BRIEF DESCRIPTION OF THE DRAWING

FIG. 1 is a perspective view of a stand constructed in accordance with the teachings of this invention;

FIG. 2 is a partially sectioned exploded view of the stand of FIG. 1;

FIG. 3 is an enlarged partial view of the stand of FIG. 1;

FIG. 4 is a perspective view of a stool constructed in accordance with the teachings of this invention;

FIG. 5 is a large sectional view of the foot support section of the stool of FIG. 4;

DESCRIPTION OF THE PREFERRED EMBODIMENTS

Figure 6:
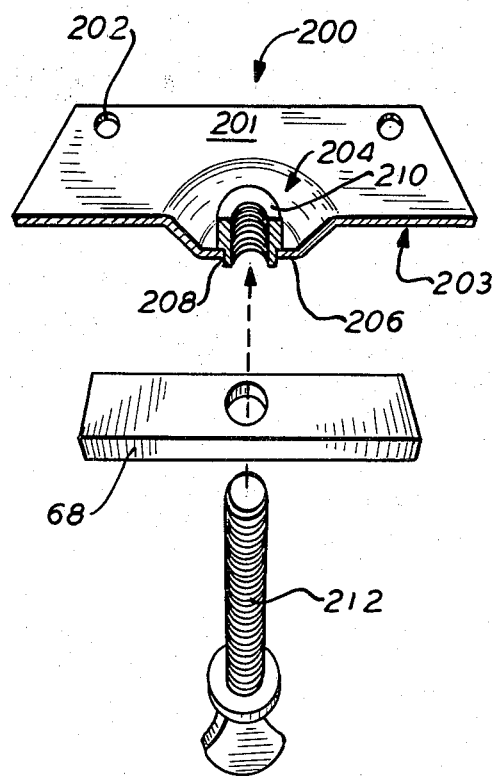
FIG. 6 is a perspective view of a mounting plate constructed in accordance with the teachings of this invention.

Turning now to the drawing, there is disclosed (FIGS. 1-3) a stand 10 constructed in accordance with the general teachings of this invention. As indicated hereinabove, the stand comprises a mount 12. The mount 12 is supported by four legs 14, 16, 18, and 20, respectively. These legs 14, 16, 18, and 20 are disposed in a pyramidal relationship with the mount 12 at the top or apex.

The mount 12 may generally comprise a substantially planar polygonal support member 22 (FIG. 2). The support member 22 may be made of any rigid material such as wood, metal, or the like. Preferably, the support member 22 is a rectangular piece of metal. Thus, for example, the member 22 may be made of 8 inch by 11 inch by ¼ inch thick steel. Centrally disposed in the support member 22 may be a depression in the upper surface (not visible) which, in turn, provides a boss 24 in the lower surface 26 (FIG. 2). The function of this boss 24 will be discussed more fully hereinafter. At the center of the boss 24 may be an aperture (not visible) for receiving therethrough a rod-like member which may be, for example, a threaded screw 28. Thus, in this example, a ⅜ inch by 2½ inch threaded carriage bolt may be used. The screw 28 may be held securely in place by any well known means such as by a force fit or fixedly by welding, an adhesive epoxy, or the like.

There may be provided a plurality of rigid brackets. Preferably, there may be four brackets 30, 32, 34, and 36, respectively, each having a substantially L-shape. Each of these brackets 30, 32, 35, and 36 may be disposed so that one leg 38 of each bracket is parallel and spaced from another leg 40 of another one of the L-shaped brackets 30, 32, 34, and 36. Disposed between the spaced and parallel legs 38 and 40 of the L-shaped brackets 30, 32, 34, and 36 may be the legs 14, 16, 18, and 20, respectively. Each of the stand legs 14, 16, 18, and 20 so positioned may be pivotally secured to the parallel bracket legs 38 and 40. The stand legs 14, 16, 18, and 20 may be made of any structural material and preferably standard ¾ inch diameter electrical conduit tubing. The brackets 30, 32, 34, and 36 may be, for example, 1¼ inches by 1¼ inches by ⅛ inch and made of aluminum. The stand legs 14, 16, 18, and 20 may be joined to the bracket legs 38 and 40 by any well known means as, for example, ¼ inch aluminum rivets 42.

At approximately the mid-point of the axial length of two adjacent support legs 16 and 14 may be pivotally secured cross bars 46 and 48. Each cross bar 46 and 48 may have a substantially elongated, rectangular shape and may be pivotally secured to respective legs 16 and 14 by any well known means, such as ¼ inch rivet 44, or the like. Thus, in this example, the cross bars may have dimensions of one inch by ⅛ inch thick and a length of 11½ inches. The bars 46 and 48 may be made of any structural material, such as steel.

Each bar 46 and 48 may have a notch 50 at one end. The notch 50 is opposite to the ends of the bars 46 and 48 which are pivotally joined, respectively, to the two support legs 16 and 14. The notch 50 is formed in the lower edge 52 of each cross bar 46 and 48, for reasons that will be more fully set out below.

In one of the two bars 46 and 48, at approximately one half its length, may be another notch 54 in the lower edge 52. Another notch 56 is formed in the top edge 58 of the other bar 48, at approximately the mid-point of its overall length. The purpose of the two complementary notches 54 and 56 will be more fully described below.

Bolts 60 may be provided in each of two support legs 20 and 18 at substantially the same point along the length thereof as are the rivets 44 in the other two support legs 16 and 14. The bolts 60 serve as engaging members for the cross bars 46 and 48 and are secured to the legs 20 and 18 by such means as, for example, a wing nut 62.

While the unattached end 64 of each support leg 14, 16, 18, and 20 may be left unfinished, it is desirable to have thereon a protective cap 64, which may be made of rubber, plastic, or the like.

In assembly, the support member 22 is positioned so that the threaded bolt 28 extends between the L-shaped brackets 30, 32, 34, and 36 and parallel to the apex 66 (defined by the juncture of the L-legs 38 and 40) of the brackets 30, 32, 34, and 36. The boss 24 aids in seating and positioning the support member 22 upon the brackets 30, 32, 34, and 36.

Washer means may be used in combination with securing means to hold the brackets 30, 32, 34, and 36 rigidly together with the support member 22. In the preferred embodiment, the washer means is a flat washer 68 and the securing means is a wing nut 70 (FIG. 2). The flat washer 68 abuts the lower edges 72 of at least two of the brackets 30, 32, 34, and 36. The washer 68 is held in place by the wing nut 70. The combination of the washer 68, one edge 72 of two of the brackets 30, 32, 34, and 36, and the support member 22 against the opposed edges (not visible) ties the mount into a unitary rigid member.

With the mount 12 assembled on the legs 14, 16, 18, and 20, the legs 14, 16, 18, and 20 may be separated into a pyramidal relationship (FIG. 1). The cross bars 46 and 48 may be disposed so that the mid-notch 54 in the lower edge 52 of one bar 46 engages the mid-notch 56 in the upper edge 58 of the other bar 48. The end notches 50 in each bar 46 and 48 may engage the bolt 60 in the legs 18 and 20, respectively. The wing nut 62 may then be tightened to secure the stand in an open and stable position.

As set forth above, the prior art devices suggest that the mount be made as a unitary object—with the bracket portions being an integral part of the support member. The reason for this is the necessity for a rigid and stable mount. However, integral mounts are cumbersome and relatively expensive to manufacture.

In the embodiment set forth herein, the rigid mount is releasably formed from separable elements. Thus, upon disassembly, the flat washer 68 may be removed from the screw 28 and the support member lifted from the brackets 30, 32, 34, and 36. Because the brackets are left as an integral part of the legs 14, 16, 18, and 20, the combination can be easily stored. There are no protruding parts and the brackets 30, 32, 34, and 36 may serve to hold the legs together while in a disassembled state. In a like manner, the substantially planar support member 22 may be easily stored. If desired, the screw 28 can be removed, thereby providing separable stored elements with no angularly protruding parts. Thus, the stand may be disassembled to occupy a minimum of space.

The support member 22 (FIGS. 1 and 2) of the stand 10 may be used to support such items as audio speakers (not shown). It is desirable for such stands 10 to support a great variety of different speaker shapes. Obviously, the greater adaptability to speakers of different shapes and sizes, the more useful the stand 10 will be. The support member 22, as has been indicated, is a generally rectangular planar configuration. The top or speaker supporting surface (not visible in FIGS. 1 and 2) should be, preferably, unobstructed. Secured to the lower surface 26 may be a threaded collar 112, which is preferably a clinch nut adjacent to each corner 114 of the support member 22.

Four identical C-shaped brackets 116 may be provided. Each bracket 116 may be "squared off" so that each leg of the C-shape is substantially straight. A first leg 118 is longer than the other two legs 120 and 122 and has a rectangular shape. Centrally disposed and parallel to the longer dimensioned side 124 of the first leg 118 may be a slot 126. The purpose of the slot 126 will be more fully disclosed herein below. The second leg 120 of the C-shaped bracket 116 extends upwardly from the narrower dimensioned side 128 of the first leg 118 at approximately 90°. The third leg 122 completes the C-shape. It is at an obtuse angle to the second leg 120 and extends inwardly and opposite the first leg 118, thereby completing the "C" shape of the bracket 116.

Each bracket 116 may be disposed so that the collar 112 is slidable within the slot 126 of the first leg 118. Thus, each C-shaped bracket 116 is placed on the lower surface 26 of the support member 22. The second leg 120 of the C-shaped bracket 116 is substantially perpendicular to the lower surface 26 and extends above the support surface. The third leg 122 extends inwardly toward the support surface. The C-shaped brackets 116 are each held in place upon the threaded collar 112 by any convenient securing means, such as a thumb screw 130. The C-shaped brackets 116 must be disposed so that they can be positioned to either of two juxtaposed sides 132 or 134, 134 or 136, 136 or 138, or 138 or 132 of the support member 22. In this manner, the C-shaped brackets 116, in combination with the support member 22, can accommodate a great many differently shaped objects, including speakers of widely different dimensions.

The basic concepts of this invention are clearly applicable to other devices. Thus, for example, one such other use may be for a stool 74 (FIGS. 4 and 5). The mount 76 (as in the device of FIGS. 1–3) has four L-shaped brackets (two brackets 77 and 79 are visible in FIG. 4). Between parallel and spaced legs 78 and 80 of each pair of L-shaped brackets 77 and 79 may be pivotally secured the stand support legs 82, as by a pin, bolt, or other means 84. The remaining support legs 86, 88, and 90 of the stool 74 are similarly secured to the brackets.

As with the stand (10 in FIG. 1), the stool 74 may be provided with two cross bars 92 and 94, each of which is pivotally secured to a support leg 88 and 90, respectively, about or below the mid-length position. The bars 92 and 94 may be pivotally secured by rivets 96 or other similar joining means. The cross bars 92 and 94 may be provided with complementary engaging notches (not visible), as with the stand 10, so that when the legs 82, 86, 88, and 90 are in position, the cross bars 92 and 94 lock the legs 82, 86, 88, and 90 in position. The free ends 98 and 100 of the respective cross bars 92 and 94 may be provided with notches to engage bolts in the same manner as the cross bars 46 and 48 of the stand 10 (FIG. 1). These bolts in the stool 74 extend through the support legs 82 and 86. The cross bars' free ends 98 and 100 are held releasably in place by wing nuts 102 and 104.

The support member 22 of the stand 10 may be replaced in the stool 74 with a smaller plate 106, which may be constructed in a similar manner as that provided in the support member 22 of the stand 10. The plate 106, which may, for example, be a piece of planar steel of 4 inches by 4 inches by ⅛ inch thick, may be centrally secured to a stool seat 108 by means commonly known in the art as, for example, nails or screws 110.

The stool seat 108 may have a well known seat construction such as, for example, be made of ⅝ inch plywood covered with one inch thick foam rubber, have an outer diameter of approximately 11½ inches, and be covered with vinyl cloth.

One support leg 86 of the stool 74 may be provided with a plurality of holes 140 disposed at predetermined intervals (FIGS. 4 and 5). The holes 140 pass directly through the leg 86. A positionable foot rest 142 may comprise a planar, substantially semicircular foot support member 144. In the preferred example, the foot support member 144 may have an approximately three inch diameter and be 1/16 inch thick steel (FIG. 5). The foot support member 144 may be secured by welding or the like to one leg 146 of an L-shaped bracket 148. The other leg 150 of the bracket 148 may depend from the foot support member 144. Extending perpendicularly from the other leg 150 may be two rod-like members 152 and 154. The first rod-like member 152 is, preferably, a threaded member. Thus, in this example, the threaded member 152 may be a No. 6 bolt. The second rod 154 may be a shorter stud. Thus, in this example, the stud may be ¼ inch by ⅜ inch long. The bolt and stud 152 and 154 should be so spaced as to be in registry with two of the holes 140 in the leg 86 of the stool 74. The bolt 152 may extend directly through a hole 140 so as to be engaged by a wing nut 156. The holes 140 permit the selective positioning of the rest 142 along the leg 86 of the stool 74, so that it can accommodate any desired position. The holes 140 in the leg 86 may be somewhat depressed to further aid in locating the rest in a stable position. It is to be understood that the mount 76 of the stool 74 employs the same structural parts and is releasably secured together, as is the mount 12 of the stand 10.

An alternative embodiment to securing the support member 22 would be to provide a plate 200 similar to the plate 106 disclosed in connection with the stool 74. This plate 200 may be used in connection with any embodiment of the invention disclosed herein. The plate 200 may be in the form of a regular polygon and preferably a square with mounting holes 202 at each corner for receiving bolts (such as bolts 110 in FIG. 4).

Figure 7:
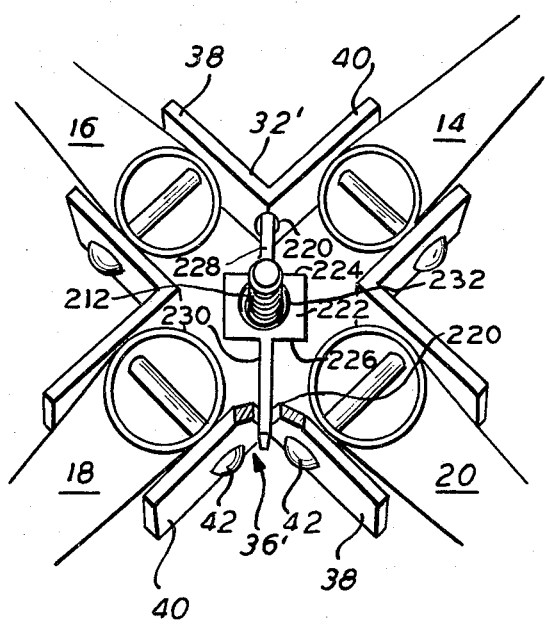
FIG. 7 is a top view of another embodiment of the stand of FIG. 1, looking downwardly from the top, with the mounting plate removed.

Centrally disposed on one side 201 of the plate 200 may be a depression 204. The depression 204, which may be formed by any well known means, such as by use of a press or the like, forms a complementary boss 206 on the reverse side 203 of the plate 200. Centrally disposed in the boss 206 or depression 204 may be an aperture 208. Secured to the plate 200 at the aperture 208, by any well known means, may be a clinch nut 210. The clinch nut 210 is positioned upside down. Instead of a bolt 28, as shown in FIG. 2, extending from the mounting plate 26, a threaded bolt 212 may be inserted through the rectangular washer 68 between the brackets 30, 32', 34, and 36' and engage the clinch nut 210 (FIGS. 6 and 7). The clinch nut 210, in combination with the bolt 212, acts to distribute the forces along the depression 204. The reversed clinch nut 210 is used to locate the bolt 212, and the major part of the forces are carried by the plate 200. It is believed that side walls of the depression 204 direct the forces away from the clinch nut 210 to the plate proper 200. The clinch nut 210 is, thereby, self-aligning.

It will be noted that the plate 200 has other applications. Thus, it may be used to mount any heavy object from a ceiling. The clinch nut 210, it will be observed, is flush with the upper surface 201 of the plate 200.

One particularly advantageous use has been observed by mounting the plate with the boss portion 206 in registry with and under the rippled flooring of a motorized van. The plate 200 is secured underneath the flooring by means of bolts or welding. A hole in the floor of the van is all that is seen. In this manner, chairs and seats within a van may be releasably secured to the van, the bolt 212 passing through the van floor and boss 206 without the additional use of external brackets inside the van.

With a bolt 212 inserted from below the mounting plate 200, it will be observed that the bolt, when released from the stand 10 or stool 74, will not be attached. This may result in its being misplaced. In order to avoid this situation, the bolt 212 may be adjustably or movably secured to the mount. Thus, opposed L-shaped brackets 36' and 32', which are of the same configuration and in the same position as the original brackets 36 and 32 (FIGS. 1 and 7), may be provided with apertures 220 at the juncture of the legs 38 and 40.

The stand 10 or stool 74 may be provided with a rectangularly shaped plate 222, which has a centrally disposed aperture therein. Extending from opposed sides 224 and 226 of this plate 222 may be extending arms 228 and 230, respectively. In assembly, the bolt 212 may be inserted and pass freely through the central aperture of the plate 222. A rubber grommet 232 may be disposed around the upper half of the bolt 212, so as to prevent the bolt from dropping through the plate 222. The extending arms 228 and 230 are passed through the respective apertures 220 of the brackets 36' and 32'. The ends of the arms 228 and 230 are bent downwardly, so as to hold the plate 222 fixedly in place. The intersection of the L-shaped arms 38 and 40 serves to hold the plate 222 fixedly in place without any further means of joining or securing. If the stand 10 or stool 74 were of the three-legged variety, the same arrangement could be used between the aligned apexes of brackets. Upon disassembly of the stand 10 or stool 74, the bolt 212 may be removed from the plate 200, but retained between the brackets.

What is claimed is:

1. A weight-supporting platform for retaining thereon an audio speaker or the like, said platform being of the type used on a speaker stand mount, said platform comprising:
   (a) a substantially planar polygonal support member for supporting a speaker on one planar side thereof;
   (b) at least two substantially C-shaped brackets, each having one leg slidably secured to said support member to the side opposed to said speaker supporting side; another leg of said C-shaped brackets extending upwardly and substantially perpendicular with respect to said speaker supporting side; said upstanding leg being selectively positionable from either one of two polygonal sides, said sides being juxtaposed such that said brackets are capable of engaging the audio speaker which extends from said juxtaposed sides.

2. A platform, as recited in claim 1, wherein said C-shaped brackets further comprise a third leg, said first two legs being at substantially right angles to one another, said third leg completing said C-shape and extending inwardly of said platform to be capable of engaging an object disposed thereon, said platform further comprises an extending collar secured to said opposed side, said first leg of said bracket having a slot therein for engaging said collar and thumb screw means for engaging said collar and holding said bracket in place.

3. A mount for a supporting device such as a stool or stand of the type having support legs disposed in a substantially pyramidal configuration with the mount at the apex, said mount compring:
   (a) a weight-supporting member;
   (b) a plurality of brackets, each comprising at least two planar legs, the opposed marginal edges of which substantially defining an L-shape; said brackets being pivotally securable to the support legs; each leg of said bracket legs being disposed parallel to the leg of another of said brackets, such that each of said support legs is disposed between said parallel bracket legs for being pivotally secured thereto;
   (c) means for engaging and releasably holding at least two of said brackets to said weight-supporting member such that, upon assembly, said engaging means and said weight-supporting members engage at least a part of each of said opposed marginal edge of two of said brackets to thereby sandwich said brackets; said holding and engaging means further comprises washer means and a threaded rod-like member at least releasably secured to said support member and extending between said brackets, said washer means comprises a flat washer upon said rod member, and fastening means upon said rod to hold said washer against said L-shaped marginal edges of said brackets; said flat washer engages at least two of said brackets, leaving the support legs free to move pivotally;
   (d) said weight-supporting member comprises a substantially rigid planar plate having a depression formed in one of its planar surfaces, said plate having an aperture disposed through said plate depression; said planar plate has a boss on the opposed side of said depression and complemenary thereto, said depression having a symmetrical shape and said aperture being located at the symmetrical center; said plate aperture is defined by a circular wall of said plate substantially perpendicular to said planar surface;
   (e) a substantially cylindrical body member; and
   (f) an axially aligned neck portion integrally formed with said body member and extending from a radially extending wall, said neck portion having a threaded axially extending bore; said body member being disposed within said depression; said radial end wall engaging said plate and said neck portion engaging and extending into said plate aperture for receiving said threaded member in said threaded bore; said neck portion being cylindrical and engaging said circular wall in a snug fit; said body member comprises a clinch nut and said plate having a symmetrical shape, said depression being disposed at the symmetrical center of such plate, said depression comprising canted side walls at an acute angle with reference to the planar surface of such plate and a disposed planar portion disposed parallel to said planar surface; said upper free radial end of said clinch nut being substantially co-planar with said planar surface of said member; said threaded member comprises a bolt; said mount further comprises means for holding said bolt in position; said holding means comprises a holding plate having an aperture therethrough; said bolt passing freely through said holding plate aperture; said holding plate having opposed armlike members integrally formed and extending therefrom; a pair of said L-shaped brackets, each having an aperture at the joinder of said L legs; said holding plate extending arms passing through said apertures for engaging said L-shaped brackets; said bolt passing through said apertures in said holding plate and into engagement with said clinch nut; and grommet means about said bolt and between said holding plate and said clinch nut to prevent said bolt from dropping freely out of said mount.

* * * * *

UNITED STATES PATENT AND TRADEMARK OFFICE
CERTIFICATE OF CORRECTION

PATENT NO. : 4,378,100

DATED : March 29, 1983

INVENTOR(S) : Ferdinand R. Minozzi et al

It is certified that error appears in the above-identified patent and that said Letters Patent is hereby corrected as shown below:

Column 8, line 22, beginning with "3. A mount for", cancel all to and including column 10, line 16, "out of said mount".

On the title page, "3 Claims, 7 Drawing Figures" should read -- 2 Claims, 7 Drawing Figures --.

Signed and Sealed this

Thirtieth Day of August 1983

[SEAL]

Attest:

Attesting Officer

GERALD J. MOSSINGHOFF

Commissioner of Patents and Trademarks